Feb. 4, 1930.　　　A. I. MARCUM　　　1,745,431
MULTIPLE WHEEL ROAD VEHICLE
Filed May 23, 1925　　　4 Sheets-Sheet 4
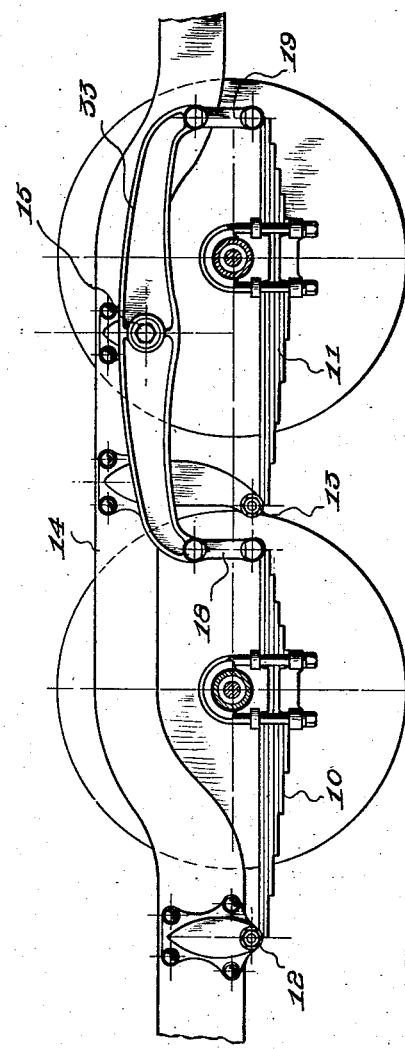
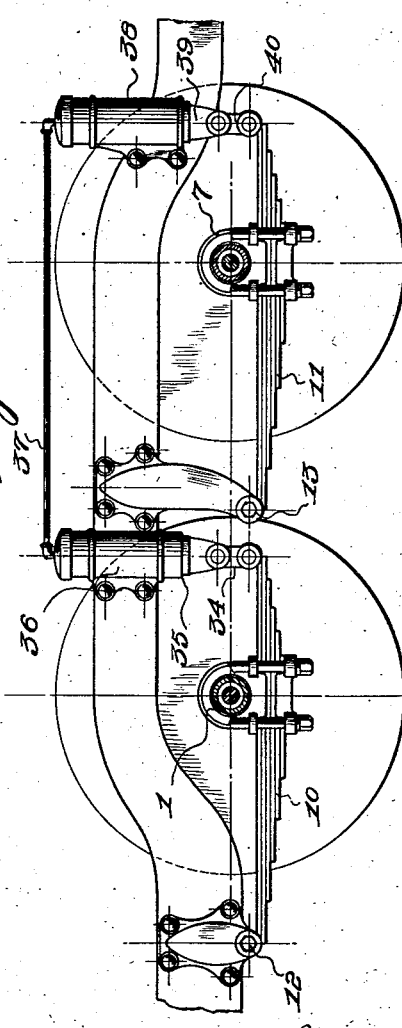

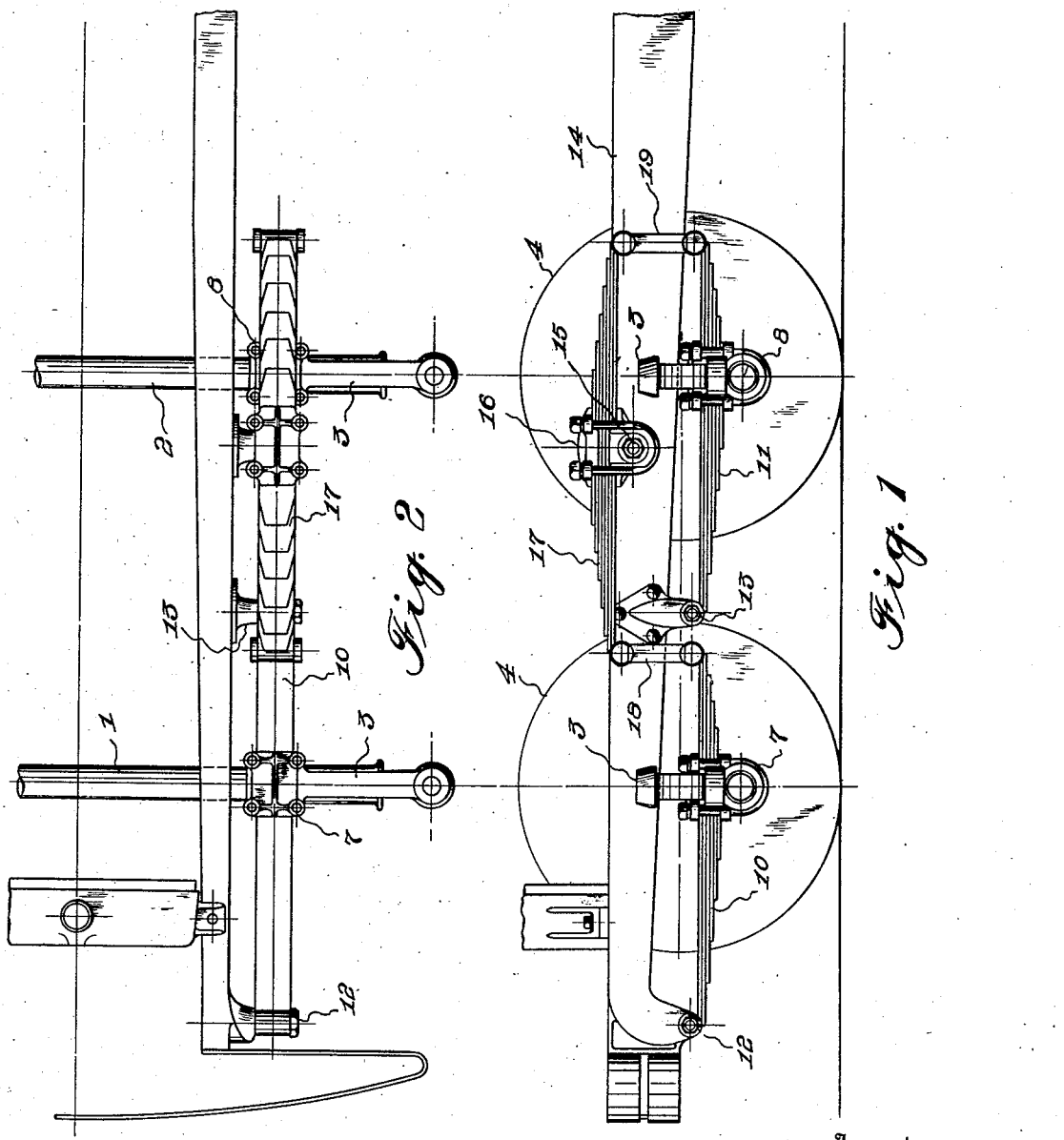

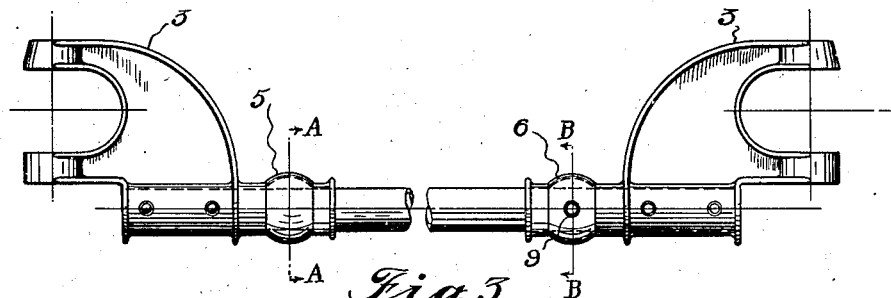
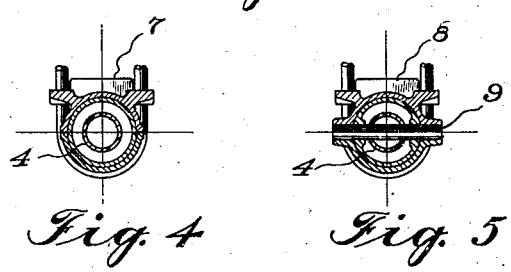
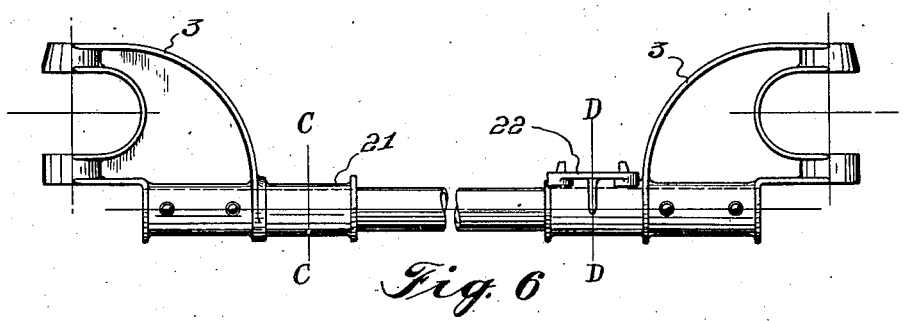
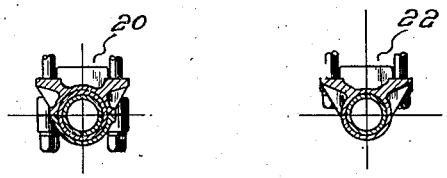

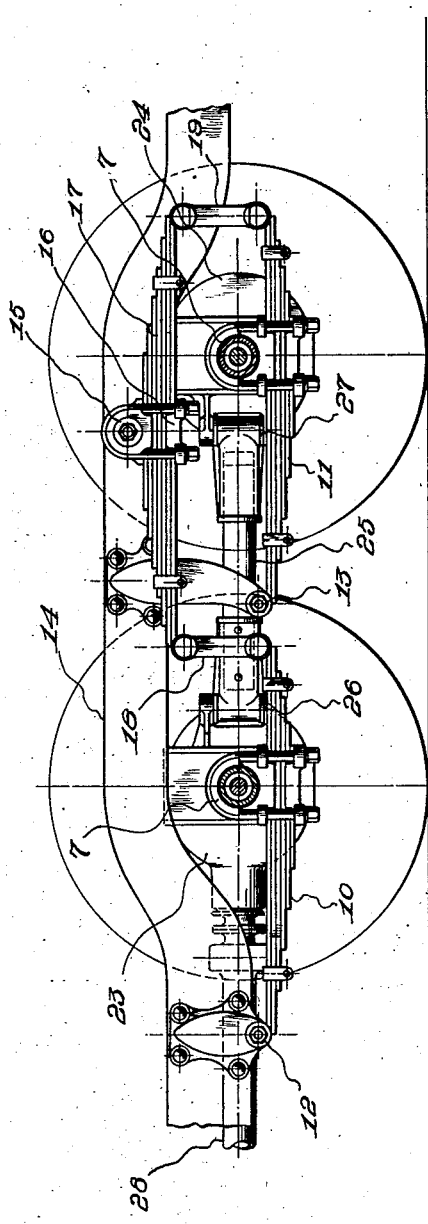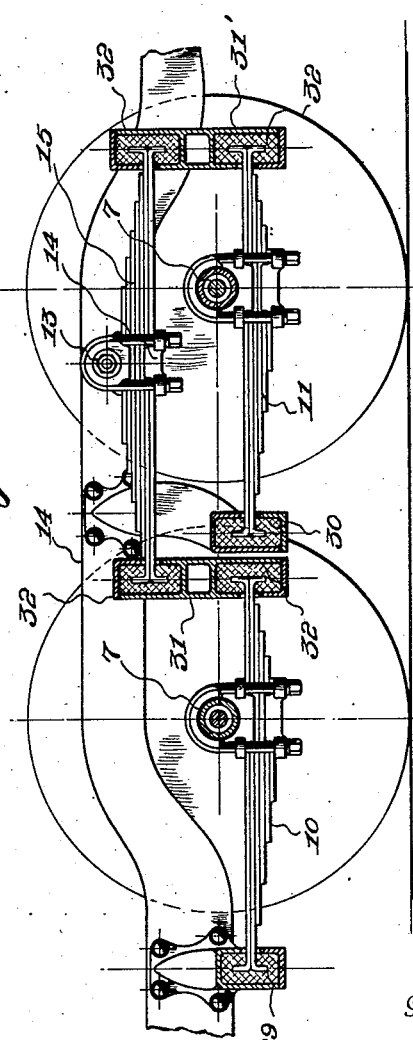

Patented Feb. 4, 1930

1,745,431

UNITED STATES PATENT OFFICE

ARTHUR I. MARCUM, OF OAKLAND, CALIFORNIA, ASSIGNOR TO EMORY WINSHIP, OF SAN FRANCISCO, CALIFORNIA

MULTIPLE-WHEEL ROAD VEHICLE

Application filed May 23, 1925. Serial No. 32,357.

The present invention relates to improvements in multiple wheel road vehicles and constitutes a continuation of that disclosed in my copending application, Serial No. 658,178, filed August 18, 1923, and now forfeited.

More particularly the invention relates to an improved spring suspension for tandem axles in multiple wheel road vehicles. Prior multiple wheel road vehicle constructions have been to a large extent commercially unsatisfactory primarily because of the difficulty in providing suitable spring suspensions which will permit the vehicle to travel over road irregularities without causing undue movements of the frame with relation to the road and because the nature of the prior proposed spring suspensions is such that unsatisfactory steering and driving mechanisms for the tandem wheels must be used. The most satisfactory of prior proposed constructions have used independent truck arrangements interconnecting the tandem axles, and the frames have been supported from the trucks at single trunnion axes. In most prior truck constructions undesirable fore and aft frame movements are introduced as the wheels pass over road irregularities, and torsional strains are introduced in the axles due to the manner of their connection to the springs. In recent developments of this type the trunnion axes have been placed substantially in the plane of the wheel axes in order to eliminate the undesirable fore and aft movements of the frame. The steering and drive arrangements heretofore proposed for the independent truck suspensions are necessarily more or less unsatisfactory because of the inherent limitations of this type of construction. The truck suspensions are particularly unsatisfactory for interconnecting tandem drive axles because of the fact that the propeller shaft or shafts from the front of the vehicle oscillate in arcs which are opposite in curvature to the arc of travel of the forward drive axle under road conditions. The result is that a rapid reversal movement of the spline connections in the propeller shaft occurs. Due to the inertia of parts and the driving stresses, axle bearings and the various joints and connections are rapidly destroyed and the life of the drive arrangement is considerably shortened. A further disadvantage of the prior truck constructions is that the frame load is taken on a single point of suspension at each side of each truck.

Objects of the present invention are to provide an improved spring suspension for multiple wheel road vehicles in which the independent truck arrangement for tandem axles is eliminated and the vehicle construction is correspondingly simplified; to provide a spring suspension for multiple wheel road vehicles in which fore and aft movement of the frame is substantially eliminated and in which the frame is suspended from a plurality of points longitudinally displaced at each side of tandem axles; to provide an improved spring suspension in which road shocks are transmitted through a plurality of springs with different periods of vibration so that the tendency for the springs to vibrate horizontally is substantially eliminated; to provide an improved spring suspension so that improved steering and drive arrangements for tandem axles may be utilized; and to provide means for connecting the axles to the springs in a manner to eliminate torsional strains in the axles as the wheels pass over the road irregularities.

Further objects of the invention are such as may be attained by a utilization of the various principles, combinations and sub-combinations hereinafter shown and described and as defined by the terms of the appended claims.

As shown in the drawings:

Figure 1 is a side elevation of a preferred embodiment of the invention as applied to the forward end of a vehicle frame.

Figure 2 is a half plan view of the form shown in Figure 1.

Figure 3 is a detail of the preferred form of axle used in the embodiment of the invention shown in Figs. 1 to 3.

Figure 4 is a sectional view taken along line AA of Figure 3.

Figure 5 is a sectional view taken along line BB of Figure 3.

Figure 6 shows a modified form of front axle for use in the embodiment of the invention shown in Figs. 1 and 2.

Figure 7 is a sectional view taken along line CC of Figure 6.

Figure 8 is a sectional view taken along the line DD of Figure 6.

Figure 9 is a side elevation of a preferred embodiment of the invention applied to the rear or drive end of a motor vehicle.

Figure 10 illustrates a modified form of the invention in which shackles of resilient materials are utilized to support the spring ends.

Figure 11 is a side elevation illustrating a modification of the form shown in Figs. 1 to 10 in which a beam is substituted for the equalizing spring.

Figure 12 is a side elevation of a form in which the equalizing spring is replaced by a fluid equalizing connection.

Referring to Figs. 1 to 5, a pair of substantially parallel axles 1 and 2 provided with axle forks 3 are each supported by a pair of steering wheels 4 journalled in and secured to the axle forks by means of suitable kingpins (not shown). Each of the axles is provided with ball members 5 formed adjacent to forks 3, and mounted on the ball members 5 and 6 are universally movable spring supporting saddles 7 and 8. Extending through the saddles 8 of each axle are the torque pins 9 which prevent rotation of the axles about the axes of the wheels 4. The saddles 8 of the axles 1 and 2 are preferably arranged on the steering side in the vehicle assembly. Secured to the saddles 7 and 8 respectively are the pairs of springs 10 and 11. The springs 10 and 11 are pivotally secured at points 12 and 13 by means of suitable brackets to opposite sides of frame 14. It will be understood that the points 12 and 13 on opposite sides of the frame are in alignment. Pivotally secured to each side of the frame at aligned points 15 are equalizing spring supporting saddles 16 to which the equalizing springs 17 are secured at their centers. The rear ends of the springs 10 and 11 are connected to opposite ends of the equalizing spring 17 by means of the pivoted connecting links 18 and 19.

By the construction so far described a multiple axle unit is provided in which the load is equalized between the axles 1 and 2 and in which a substantial movement of the axles with relation to each other in all directions and a compound rotary motion of each axle independently of the others with relation to the frame is permitted as the vehicle travels over road irregularities. At the same time rotation of the axles about the wheel axes is prevented by the pins 9. By providing the pins 9 in only one of the spring saddles of each axle, when a wheel passes over road obstructions or drops into a depression, the corresponding axle will rotate a slight amount in the saddle without the torque pin, and no torsional twist will be introduced in the axles due to the rotation of the axle in a vertical plane with relation to the frame.

The connection of the pairs of springs 10 and 11 to the frame at points 12 and 13 establishes neutral axes of motion between the frame and the axles from which connections from the axle and frame supported steering and brake operating linkages can be made in a manner to free the steering and braking connections from the distorting effects of the relative axle and frame movements.

Road shocks and axle movements must pass through the three springs on each side of the frame before they are transmitted to the frame, and because of the difference in the lengths of springs 10, 11, and 17 and the positioning of the axles to the rear of the centers of springs 10 and 11, the shocks are transmitted through a plurality of spring arms with different periods of vibrations. The linkages are such that the actual frame movement without spring deflection would be one half of the axle movement. Because of the suspension of the frame at a plurality of points from each spring linkage the frame load is distributed, and relatively light flexible springs may be used. The amount of spring deflection may accordingly be made sufficient to prevent substantial movement of the frame as the wheels pass over road obstructions, and the different periods of vibration of the various spring arms deaden the tendency of the frame to vibrate harmoniously due to road impacts. In this manner a spring suspension for road vehicles is provided in which substantially no movement of the frame occurs as the wheels pass over road irregularities with the result that road impacts due to the energy required to shift the frame in usual constructions are substantially reduced and pneumatic tires may be utilized for relatively heavy vehicles. It will be noted that although the frame on each side is suspended at three points from the spring mountings, if the rear end of the frame is not supported it will not remain horizontal but will tilt toward the heavy end.

In the form shown in Figs. 1 to 5 because of the ball hanger and torque pin construction no twist is introduced into the spring leaves as the axles move in a vertical plane with relation to the frame. Because of the flexible nature of the springs which may be utilized, the manner of securing the axles to the springs 10 and 11 may be modified by substituting for the ball hangers 7 and 8 a saddle 20 journaled on the axles 1 and 2 at 21, and a saddle 22 rigidly secured to each axle. The saddles 22 of the axles 1 and 2 are preferably disposed on the steering side of the frame in alignment with each other. The arrangement of the springs is otherwise as shown in Figs. 1 and 2 with the exception that torque pins 9 are eliminated. In this form one spring of each pair of the springs 10 and 11 is rotatably secured to the axles and the other spring of each pair is rigidly secured thereto so that as the axles rotate in a vertical plane with relation to the frame they are permitted to rotate in the saddle 20 without setting up torsional strains in the axles, but a slight twist is introduced in the spring leaves. Otherwise the operation is the same as the form shown in Figures 1 to 5.

In Fig. 9 the application of my improved spring suspension to a set of substantially parallel interconnecting drive axles is disclosed. In this form the springs 10 and 11 are each connected by means of ball hangers 7, similar in construction to those shown in Figure 4, to differential drive axle housings 23 and 24. The drive axle housings 23 and 24 are universally movable with relation to the springs 10 and 11 because of the ball hanger construction. Rotation of the axles about the supporting wheel axes is, however, prevented by means of tubular, telescopic torque resisting connection 25 extensible under normal load conditions, which is pivoted vertically to the axle housings 23 and 24 at points 26 and 27. The axle 23 is driven by a spline shaft 28 from the forward end of the vehicle and the axle 24 is driven by a telescopic intermediate shaft from the axle 23. It will be noted that the axis of the spline shaft 28 is substantially in the plane of the wheel axes under normal load conditions as shown in the drawings and that as the vehicle passes over road irregularities the movement of the axle 23 with relation to the frame is about points 12 which are disposed between the forward end of the vehicle frame and the axle. In this way, as the axle shifts with relation to the frame under road conditions substantially no movement of the spline shaft occurs and the angularity of the spline shaft is reduced to a minimum. The torque resisting connections between the axles 23 and 24 hold the axles and the intermediate drive shaft in substantial alignment and prevent rotation of the axle housings about the wheel axis independently of the frame and the springs. As the rear axle 24 oscillates about the points 13 disposed between the axle and the forward end of the truck the intermediate shaft travel is also reduced to a minimum. The operation of this form of suspension as the vehicle travels over road irregularities will be understood by a reference to the description of the forms shown in Figs. 1 and 2 as above set forth, like parts having been given the same reference characters in the drawings. Further description, therefore, need not be given.

In the form shown in Fig. 10 the improved suspensions above set forth are modified by substituting blocks of resilient material for the shackle pins or bolts used in the forms heretofore described. Springs 10 and 11 are in this form supported at their forward ends in the rubber blocks 29 and 30 from the frame, and the rear ends of these springs are connected to the ends of springs 17 by means of the links 31 and 31' in which the rubber blocks 32 supporting the spring ends are seated.

In the form shown in Figure 11, a rigid beam 33 is substituted for spring 17 of the forms as shown in Figs. 1 to 9. The operation of this form will be the same as for the forms above set forth except that the resilience of the connecting linkage is reduced.

In Figure 12 the forms shown in Figures 1 to 11 are modified by substituting for the equalizing springs 17 fluid equalizing connections. As shown in the drawing the rear ends of springs 10 at each side of the frame are connected by means of links 34 to the pistons 35. The pistons 35 are adapted to reciprocate in the cylinders 36 and the cylinders 36 are connected by means of pipe connections 37 to the cylinders 38 which are secured to the frame. Pistons 39 are adapted to reciprocate in the cylinders 38 and are connected by links 40 to the ends of springs 11. Air under sufficient pressure to support the frame is forced into the cylinders 36 and 38. In operation of this form the air pressures equalize between the cylinders and road shocks on either axle are transmitted through the springs and fluid system to the other axle and are largely absorbed without transmission to the frame. It will be noted that the equalization between the springs 10 and 11 in the fluid system is such that the frame load is distributed equally between the axles and that if the front end of the frame is not supported, because of this equalization, it will tilt downward.

It will be seen that interconnecting and equalizing spring suspensions for parallel or tandem axles are provided in which separate trucks are eliminated and from which the frame is supported at a plurality of points. In eliminating the separate truck construction for maintaining the tandem axles in predetermined relative positions a simplified method of supporting the frame in multiple wheel road vehicles is provided in which undesirable fore and aft movements of the frame as the wheels pass over road obstructions are eliminated and in which improved drive and steering and braking constructions may be utilized.

Having described preferred embodiments of my invention, what is desired to be secured by Letters Patent and claimed as new is:

1. The combination with a vehicle frame and a pair of axles, of a leaf spring secured intermediate its ends to each axle, each leaf spring being connected at its forward end to the vehicle frame, a third leaf spring connected to the vehicle frame and shackles connecting the ends of the third leaf spring with the rear ends of the leaf springs secured to the axles.

2. The combination with a vehicle frame and a pair of axles, of a leaf spring secured intermediate its ends to each axle, each spring being pivotally connected at its forward end to the vehicle frame, a leaf spring fulcrumed intermediate its ends on the vehicle frame and shackles connecting the ends of the latter spring with the rear ends of said first mentioned springs.

3. The combination with one side of a vehicle frame and a pair of axles, of a leaf spring secured intermediate its ends to each axle, each spring being pivotally connected at its forward end to the vehicle frame, and means connecting the rear ends of the springs together and to the frame to transmit a portion of the reactions of one spring immediately and directly to the other spring when the vehicle passes over road irregularities.

4. The combination with a vehicle frame and a pair of axles, of a leaf spring secured intermediate its ends to each axle, each spring being pivotally connected at its forward end to the vehicle frame and means directly and mechanically connecting the rear ends of the springs together whereby movement of the rear end of one spring is transferred immediately to the rear end of the other spring.

5. A vehicle comprising a frame; a pair of axles arranged in tandem beneath said frame; a pair of ground engaging wheels supporting each axle; and a spring suspension disposed at each side of said frame and directly attached to rigid portions thereof at three longitudinally spaced points, each spring suspension including resilient means connected together and to said frame to transmit road shocks from one of the wheels at the corresponding side of the frame to the other wheel at the same side of said frame.

6. The combination with a vehicle frame supported at one end by tandem axles, of springs secured adjacent each side of said frame to said axles and directly pivoted to said frame at longitudinally spaced points so that said axles swing in substantially parallel paths, and separate means adjacent each side of said frame to transmit, immediately, all shocks tending to swing one axle in any direction about its pivotal point to the other axle in a reversed direction.

7. A spring suspension for one side of a tandem axle vehicle including springs individual to each axle and connected thereto by universal joints whereby they are free to tilt with respect to said springs, means to separately directly attach each of said springs to the vehicle frame at one end, and means interconnecting said springs and frame to equalize the load on said axles and to permit said tilting movement of the axles.

8. A spring suspension for a tandem axle vehicle including springs individual to each axle at each side of the vehicle frame and connected thereto in a manner permitting limited transverse tilting movement of the axles relative to the springs, one of said connections for each axle embodying means to resist the tendency of the axle to rotate about the wheel axis, and separate means interconnecting said springs and the vehicle frame at each side thereof to equalize the load between the axles while permitting the axles to swing and tilt.

9. A road vehicle including a frame, tandem axles, a spring individual to each axle adjacent each side of said frame, and means mechanically interconnecting said springs and said frame at each side thereof to cause the shocks to one of said springs to be transmitted immediately to the other spring, said last named means serving to substantially maintain the axes of the axles equally spaced under all conditions of service.

10. A road vehicle including a frame, tandem axles, a spring for each axle at each side of said frame, means to secure one end of each of said springs to the frame at points spaced apart a distance substantially equal to the distance between the axes of the axles, and independent means to equalize the load on said axles at each side of said frame and to transmit all shocks from the spring individual to one axle at one side of said frame to the spring individual to the other axle at the same side of said frame.

11. A road vehicle including a frame, tandem axles, a spring individual to each axle, means to attach one end of each of the springs to the frame in a manner substantially preventing bodily movement of the axles endwise of the frame, and mechanical means directly interconnecting said frame and springs to divide the load between the axles.

12. A spring suspension for one side of a road vehicle embodying a frame and a pair of axles disposed relatively close together adjacent one end thereof, comprising means directly pivoted to the frame at one end for connecting one of said axles to said frame so that it may swing about said pivot, a second means directly pivoted to said frame and secured to the other axle so that said axle is free to swing about the last named pivot and mechanism interconnecting both of said means to the frame of the vehicle to distribute the load on said side of the vehicle on said axles and to immediately transmit a portion of the shock applied to one axle to the other axle.

13. A spring suspension for one side of a road vehicle embodying a frame and a pair of axles disposed relatively close together adjacent one end of the vehicle, comprising a spring directly pivoted at one end to said frame and connected to one of said axles, a second spring secured to the other axle and directly pivoted at one end to said frame at a point spaced longitudinally from the pivotal point of said first named spring and means pivoted between its ends to said frame and connected at opposite ends to said first and second named spring respectively, so that the load on said side of the vehicle is distributed between said axles and shocks tending to cause one axle to swing about its pivotal connection to the frame are directly transmitted through said means to the spring that connects the other axle to the frame.

14. A spring suspension for one side of a road vehicle embodying a frame and a pair of axles disposed relatively close together adjacent one end of the vehicle, comprising a spring directly pivoted at one end to said frame and connected to one of said axles by a universal joint, a second spring secured to the other axle by a universal joint and directly pivoted at one end to said frame at a point spaced longitudinally from said first named pivot, and a spring pivoted to said frame between its ends and connected at its ends to said first and second named springs respectively, whereby said last named spring distributes the load to said first named springs and interconnects them so that rotation of one of the springs secured to an axle is yieldingly resisted by the other spring secured to the other axle at that side of the vehicle.

15. A spring suspension for one side of a road vehicle including a frame and a pair of axles disposed relatively close together adjacent one end of the vehicle comprising a spring for each axle, each of said springs being secured to an axle and directly pivoted at one end to said frame, the pivotal points being so disposed that the axles swing in substantially parallel arcs, and means secured to both of said first named springs and to said frame to connect said springs to each other and to the frame, said last named means being arranged to distribute the load on said side of the vehicle on said springs and to directly transmit a portion of every vertical reaction on one of said springs to the other spring.

16. A spring suspension for one side of a road vehicle including a frame and a pair of axles disposed relatively close together and supporting one end of the vehicle, comprising a spring for each axle, each of said springs being secured to an axle and directly pivoted at one end to said frame, a third spring pivoted to said frame between its ends at a point adjacent one of said first mentioned springs and connected at its ends to each of said first named springs respectively, certain of said springs having differing natural periods of vibration.

17. In combination with one end of a vehicle frame, tandem wheels and axles disposed below said end in spaced relation thereto, and a spring suspension on each side of said frame resiliently supporting said end in said spaced relation; said spring suspension comprising a spring structure attached to each axle, mechanical equalizing means interconnecting said spring structures, and means for attaching said suspension at three separate points on the vehicle frame, two of said attachment means comprising direct pivotal connections of the spring structures to rigid portions of the frame.

In testimony whereof I affix my signature.

ARTHUR I. MARCUM.